US011061872B2

(12) United States Patent
Castrati et al.

(10) Patent No.: US 11,061,872 B2
(45) Date of Patent: Jul. 13, 2021

(54) INTEGRATING A LEGACY STATIC SYSTEM WITH AN EVENT-BASED SYSTEM

(71) Applicant: International Business Machines Corporation, Armonk, NY (US)

(72) Inventors: Anthony Castrati, Knightdale, NC (US); Gregory Chatham, Cary, NC (US); Balakrisna Kolla, Cary, NC (US); Thatta V. Premnath, Cary, NC (US); Thomas J. Reedy, Wake Forest, NC (US); Jordan S. Simpson, Raleigh, NC (US); Adrian Vrouwenvelder, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 16/161,305

(22) Filed: Oct. 16, 2018

(65) Prior Publication Data
US 2020/0117727 A1    Apr. 16, 2020

(51) Int. Cl.
*G06F 16/00* (2019.01)
*G06F 16/21* (2019.01)
*G06F 9/54* (2006.01)
*G06F 16/11* (2019.01)
*G06F 16/178* (2019.01)
(Continued)

(52) U.S. Cl.
CPC .......... *G06F 16/211* (2019.01); *G06F 9/542* (2013.01); *G06F 16/11* (2019.01); *G06F 16/178* (2019.01); *G06F 16/2358* (2019.01); *G06F 16/254* (2019.01)

(58) Field of Classification Search
None
See application file for complete search history.

(56) References Cited

U.S. PATENT DOCUMENTS 8,479,150 B2    7/2013  Grechanik et al.
9,442,995 B2    9/2016  Pareek et al.
(Continued)

OTHER PUBLICATIONS

Aasman, Jans, "The marvels of an event-based schema", InfoWorld, Feb. 26, 2018, 5 pages.
(Continued)

*Primary Examiner* — Hung Q Pham
(74) *Attorney, Agent, or Firm* — Stephen J. Walder, Jr.; Ryan G. Lewis

(57) ABSTRACT

Mechanisms are provided for integrating a legacy static data storage system with an event based data storage system. Catch-up logic generates, for pre-existing legacy data in the legacy static data storage system, catch-up events for integrating the legacy data in the event based data storage system. A trigger processor generates, at approximately a same time that the catch-up events are generated, triggered events in response to one or more database triggers of the event based data storage system being activated. Both the catch-up events and the one or more triggered events are stored in an event log data structure. An event log monitor processes the catch-up events in the event log data structure to integrate the pre-existing legacy data into the event based data storage system. The event log monitor processes the one or more triggered events after all catch-up events in the event log data structure have been processed.

19 Claims, 4 Drawing Sheets

(51) Int. Cl.
*G06F 16/23* (2019.01)
*G06F 16/25* (2019.01)

(56) References Cited

U.S. PATENT DOCUMENTS

2013/0318044 A1* 11/2013 Pareek ............... G06F 16/3331
707/635
2014/0040197 A1 2/2014 Wijayaratne et al.

OTHER PUBLICATIONS

Disclosed Anonymously, "Data redistribution in a shared nothing system without record logging", IP.com Prior Art Database Technical Disclosure, IP.com No. IPCOM000218277D, May 31, 2012, 4 pages.
Elo, Lauri, "From Event Planning to Legacy Planning", Haaga-Helia, University of Applied Sciences, Master's Thesis, Degree Programme in Sport Development and Management, 2016, 190 pages.
IBM, "Method and System for Automated Record Monitoring, Event Detection, and Dispatch of Notifications", IP.com Prior Art Database Technical Disclosure, IP.com No. IPCOM000177922D, Jan. 9, 2009, 4 pages.
IBM, "Method for uniquely identifying event records and guaranteeing their delivery to remote targets", IP.com Prior Art Database Technical Disclosure, IP.com No. IPCOM000190313D, Nov. 23, 2009, 4 pages.
Roth, Heinz et al., "Event Data Warehousing for Complex Event Processing", 2010 Fourth International Conference on Research Challenges in Information Science (RCIS), May 19-21, 2010, 11 pages.

* cited by examiner

INTEGRATING A LEGACY STATIC SYSTEM WITH AN EVENT-BASED SYSTEM

BACKGROUND

The present application relates generally to an improved data processing apparatus and method and more specifically to mechanisms for integrating a legacy static system with an event-based system.

As described in Jans Aasman, "The Marvels of an Event-Based Schema," InfoWorld, Feb. 26, 2018, users and organizations are increasingly dealing with decentralized computing environments in which external data, often semi-structure or unstructured, needs to be integrated with internal, structured data. Storing each external source's data in a separate database is not a practical approach for various reasons including the need to cross-reference or aggregate data horizontally. The rapid storing and querying of diverse data at scale necessitates a simplified, all-inclusive schema without losing any information, which often occurs in schema simplification attempts.

Event based schema approaches provide a solution where the ease of the approach lies in the fact that any data related occurrence can be transformed into an event. No matter what the data is, it may be easily categorized according to event type, actors, start and end time, location, and any other factors relative to the data. The simplicity of the overall schema is that whatever the events are, they are all described the same way according to the event features, e.g., event type, actors, time, etc.

While an event based schema for data storage is an attractive solution, there are issues associated with transitioning from, or integrating, a legacy static data storage solution to an event based data storage solution which need to be resolved.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system comprising at least one processor and at least one memory, for integrating a legacy static data storage system with an event based data storage system is provided. The method comprises enabling an integration feature that initiates integration of the legacy static data storage system with the event based data storage system. The method further comprises generating, by catch-up logic of the data processing system, for pre-existing legacy data stored in the legacy static data storage system, catch-up events for integrating the legacy data in the event based data storage system. Moreover, the method comprises generating, by a trigger processor of the data processing system, at approximately a same time that the catch-up events are generated, one or more triggered events in response to one or more database triggers of the event based data storage system being activated. In addition, the method comprises storing both the catch-up events and the one or more triggered events in an event log data structure in response to the generation of the catch-up events and the generation of the one or more triggered events. Furthermore, the method comprises processing, by an event log monitor of an event processor in the data processing system, the catch-up events in the event log data structure to integrate the pre-existing legacy data into the event based data storage system. The method also comprises processing, by the event log monitor, the one or more triggered events after all catch-up events in the event log data structure have been processed.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
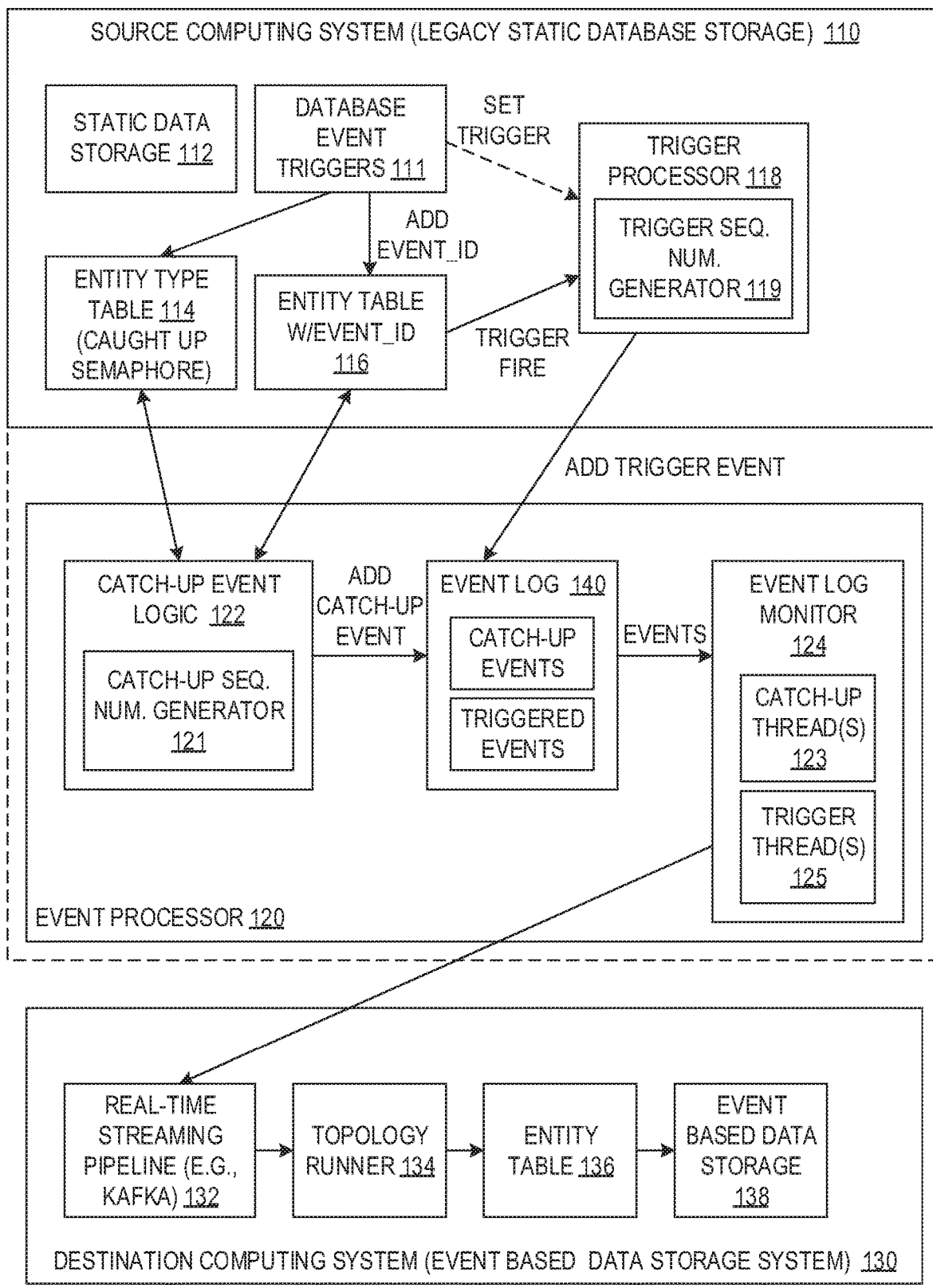
FIG. 1 is an example block diagram of operational elements of a computing system for handling the integration of legacy static data from a static data storage system to an event based data storage system in response to the enablement of an integration feature in accordance with one illustrative embodiment.

There are instances where an organization or individual (hereafter referred to as an "entity") wishes to change their data storage schema, e.g., from a static data storage to an event based data storage, such that their data storage associated with an existing legacy static data storage system, i.e. a system where data is kept updated but there is no change history maintained, is integrated with an event based data storage system, i.e. a system where the history of data changes (e.g., insertions, modifications, deletions) is maintained in conjunction with the actual data. That is, at some point while the entity is utilizing the legacy static data storage system, the entity will enable a functionality or feature of the event based data storage system that couples the two data storage systems. The feature or functionality enablement may be any operation that a user carries out that couples the two data storage systems, may be an upgrade of the legacy static data storage system to the event based data storage system, or the like. That is, the feature or functionality may be code that is ready to execute virtually immediately after deployment of the event based data storage system, for example, and is activated via a user interface, e.g., a checkbox being checked, a virtual button for enabling the integration feature/functionality, or any other user selectable user interface element. The feature or functionality that is enabled which initiates the operation for integrating the legacy data of the legacy static data storage system to the event based data storage system, and thereby integrating the legacy data into the event based data storage system, is referred to herein as the integration feature.

Prior to the integration feature being enabled, the data is stored in the legacy static data storage system. After the integration feature is enabled, data still exists in the legacy static data storage system, however events are occurring with regard to the newly enabled event based data storage system in response to actions being performed on data in the legacy static data storage system, e.g., additions, deletions, modifications, etc. Once the integration feature is enabled, the data present in the legacy static data storage system needs to be duplicated to the event based data storage system so that users viewing data via the event based data storage system are viewing the correct data in real-time. Thus, as users perform operations to add/delete/change data in the legacy static data storage system, these operations are reflected as events in the event based data storage system so as to maintain synchronous the data in the static data storage system and the event based data storage system.

In such instances, since both storage systems are essentially "live" in the sense that users are using them, it is important to minimize downtime and maximize the speed of the operation of the event based data storage system. Approaches that require taking the storage systems down, i.e. making them inaccessible to users, in order to enable copying over of the data from the legacy static data storage system to the event based data storage system, cause too high a downtime where both storage systems are essentially unusable until the synchronization of the data in the storage systems is complete. This downtime is increased as the size of the data in the legacy static data storage system increases.

Thus, it would be beneficial to have a data storage system implemented mechanism that provides computer functionality to integrate legacy static data from the legacy static data storage system (hereafter referred to as the "source system") to the event based data storage system (hereafter referred to as the "destination system"), with minimal downtime and maximum speed, in response to an integration feature enablement that couples the source system with the destination system. Assuming a unidirectional data flow, i.e. from the source computing system, comprising the legacy static data storage system, to the destination computing system, comprising the event based data storage system, upon feature enablement, the solution of the illustrative embodiments provide the benefits of no duplicate events being generated, events arriving at the event-based data storage system in chronological order (e.g., adds precede deletes), events flowing in real-time, a performant solution, and there being no, or at least minimal, downtime.

To illustrate the advantages of the data storage system implemented mechanisms of the illustrative embodiments, it will be assumed that the source system comprises a static database storage system and the destination system comprises an event-based database storage system. It should be appreciated that prior to the instigation of an integration operation by the enablement of an integration feature, the source computing system comprises the legacy static database with its corresponding entity tables that identify the sub-tables within the static database storage system. Moreover, prior to the integration feature being enabled, the destination computing system is separate and distinct from the source computing system, but may comprise an event based database storage system, such as an Apache Hive-based data storage system.

The mechanisms of the illustrative embodiment, upon deployment at the source computing system in anticipation of an integration of the legacy static database data storage into the event based database storage system, a deployment operation is executed, which in one illustrative embodiment involves a series of structured query language (SQL) scripts. This deployment operation updates the schema of the legacy static database storage system for use with the event based data storage system by implementing the logical structures and processes described hereafter. This deployment operation creates an event log data structure and an entity type table data structure in the source computing system. Moreover, this deployment operation also modifies the existing legacy static entity table data structures of the source computing system to include an additional column of data referred to as the "event_ID" column. The purpose of this new column is to be able to back-reference events to the original legacy data present in the legacy static database storage system, thereby providing traceability and a reduction in the duplication of data. Furthermore, the deployment operation sets triggers, i.e. portions of code that are executed in response to an action being performed, on the entity table data structures and the event log data structure.

As noted above, one of the logical data structures generated by the deployment operation is the entity type table data structure. The entity type table data structure, and its corresponding logic for maintaining the entity table data structure, which are introduced into the source computing system (also sometimes referred to herein as simply the "source system") are multipurpose, with the table data structure containing a listing of the entities whose data has been transformed into events in the event log data structure, and further contains a semaphore, e.g., Boolean column in one illustrative embodiment, that indicates whether or not the corresponding entity has been "caught-up" via the catch-up event processing of the legacy data from the legacy static database storage system, as will be described in greater detail hereafter.

The event log data structure generated by the deployment operation records events that are to be processed by the destination system, and acts as both a record as well as a first-in-first-out (FIFO) queue cache for events recorded in the event log data structure. The event log data structure records which events have been processed by the destination system and which have not (as a type of queue head) so that processing can resume if interrupted. In accordance with the illustrative embodiments, the event log data structure may store both "catch-up" events generated for the pre-existing legacy data present in the legacy static database storage prior to enablement of the integration feature, and events generated in response to the firing of triggers due to actions being performed on data in the legacy static database storage after enablement of the integration feature.

In addition, an event processor is provided that comprises logic for generating a "catch-up" event for each portion of pre-existing data in the source system, e.g., each pre-existing entity in the legacy static database of the source system existing prior to enabling the integration feature. These catch-up events generated by the catch-up event logic of the event processor are recorded in the event log data structure for processing by the destination system at substantially a same time that other events occurring due to firing of set triggers are being generated. For example, to generate catch-up events, the entity type table data structure, which stores an entry for each entity present in the legacy static database of the source system, may be analyzed by the catch-up event logic of the event processor to thereby generate a catch-up event for each entity in the legacy static database of the source system, where the corresponding catch-up events are written to the event log data structure via an add catch-up event operation. The "caught-up" semaphore of the corresponding entry in the entity type table data structure may then be set to indicate that the entity has been "caught-up", meaning that a catch-up event has been generated for the entity by the catch-up event logic and the event has been stored in the event log data structure.

In addition, the event processor further comprises logic for monitoring the event log data structure to send unprocessed events to the destination system in accordance with the event ordering of the illustrative embodiments. The catch-up events may arrive at the destination system for processing in any order, however it is important that events generated from pre-existing data in the legacy database storage of the source system, i.e. the catch-up events, are processed prior to triggered events that occur after the integration feature was enabled that coupled the legacy (source) data storage system to the event based (destination) data storage system.

For example, during a catch-up phase of operation in which catch-up events are being processed for pre-existing data in the legacy static database storage and at approximately a same time, new events are being generated in response to manipulations of data occurring via the newly enabled event based database storage system, a user may decide to delete an item from a table of the database. It should be appreciated that during this catch-up phase of operation, the event based database storage system (destination system) is maintained synchronous with the legacy static database storage system during this transition from the legacy static database storage system schema to the event based database storage system schema. The deletion, which targets the entity in the legacy static database as part of the unidirectional flow of data from the source system to the destination system, results in a database trigger (set by the deployment operation) being activated or "fired", causing a delete-item triggered event to be generated and added to the event log data structure. If the delete-item event somehow reaches the destination storage system before the add-item event corresponding to the catch-up event associated with existing data in the legacy static database storage system, then the result is that the destination system will have a record of an item that the source system no longer knows about. During a steady state phase of operation after all caught-up events have been processed, it should be appreciated that only triggered events will be present in the event log and thus, the catch-up processing may, at that time, be quiesced.

Two different disjointed thread groups are utilized in an event log monitor to maintain the proper ordering of catch-up events (events associated with integrating legacy data from the legacy static database of the source system into the destination system) and triggered events (events triggered by event based database triggers after enabling the integration feature). A first thread group, referred to as the catch-up thread group, comprises one or more threads that are responsible for processing events for the legacy data, or entities, pre-existing in the source system. Because the ordering of catch-up events does not need to be preserved when sending the catch-up events to the destination system, other than to ensure that the first triggered event is sent to the destination system only after the last catch-up event has been sent to the destination system, the order of the block of catch-up events may be processed in a more flexible manner. Thus, any number of catch-up threads may be spawned to handle the catch-up event processing, as long as these threads rendezvous their processing to post a single catch-up complete event log entry in the event log after all the pre-existing data in the source system has had a corresponding catch-up event generated and an event log entry added for it. The second thread group, referred to as the trigger thread group, comprises one or more threads that are responsible for generating events corresponding to database triggers that are activated or "fired" once the integration feature has been enabled. The ordering of the triggered events is carefully preserved using assigned sequence numbers, as described hereafter.

These two different disjointed thread groups allow for a performant solution rather than utilizing a single thread to process all events in a chronological manner. That is, one solution to ensure that pre-existing (catch-up) events arrive at the destination system prior to triggered events is to utilize a single thread to process all the data by iterating through the data in a chronological (or top-down) order to generate the requisite events which are then processed by the event based database system (destination system). However, as this process would be happening at approximately the same time as new events are being generated based on new activations or "firings" of database triggers, it is important to be able to monitor for these new events and the changes to data in the database corresponding to these new events. It would not be a performant solution to use a single thread or thread group to iterate through a table periodically, looking for changes, especially in a large database system. However, by implementing different thread groups for handling the catch-up events and the database trigger events, a performant solution is provided.

Since two different disjointed thread groups are implemented in the illustrative embodiments, with the catch-up events being generated for the legacy data in the static database of the source system and the trigger events for new events generated for database triggers that have been activated since the integration feature was enabled, a new event ordering architecture is provided to ensure that the triggered events are processed after the initial catch-up events while maintaining the chronological order of triggered events. With this architecture, in order to preserve order of the generated events, an event log data structure is provided that operates as an event cache by holding events that are to be forwarded to the destination system. In order to ensure proper sequencing of the events, in one illustrative embodiment, two sequence number generators are utilized, one for each of the types of generated events, i.e. one for catch-up events (catch-up sequence number generator) and one for triggered events (triggered sequence generator). Both the catch-up sequence number generator and the trigger sequence number generator produce monotonically increasing values that are distinguishable as catch-up or triggered sequence numbers.

It should be appreciated that while this illustrative embodiment uses two separate sequence number generators, in other illustrative embodiments, a single sequence number generator may be used to provide both the catch-up and triggered sequence numbers by adding a constant C to the trigger sequence numbers, where C is greater than the total number of catch-up events that can possibly be generated for existing data in the legacy static data storage system (source system). Thus, for catch-up events, the single sequence number generator would assign relatively lower sequence numbers to the catch-up events than the triggered events with the constant C ensuring that the sequence numbers do not overlap.

For the two separate sequence number generator embodiment, the two separate sequence numbers are also maintained separate and non-overlapping as well since they will be handled by a common event log monitor as described hereafter. Thus, the two sequence number generators, or the single sequence number generator with the application of the constant C to the triggered events, assign sequence numbers to events as they are written to the event log, which holds the events for forwarding to the destination system.

When the integration feature is enabled, the database triggers of the event based data storage system (destination system) are set and may begin to be activated or "fired." Contemporaneously, the catch-up process for generating catch-up events for pre-existing legacy data in the source system, and sending them to the event log where they are given catch-up sequence numbers, executes. Events are created and placed into the event log by a trigger event process and catch-up process concurrently.

Event log monitor logic monitors the event log and forwards events it finds in the event log to the destination system. Catch-up events may be forwarded immediately, in order, as they are generated by the catch-up process of the catch-up event logic, i.e. event log entries are converted into actual events and sent to the destination system. Thus, the event log entries for catch-up events are "consumed" in a queue-like fashion by the event log monitor, meaning that they are marked in such a way that they are not processed again by the event log monitor. The event log entries are not removed, but rather remain in the event log for audit and/or good practice (GxP) purposes.

Forwarding of triggered events is repressed until the catch-up processing is complete, as evidenced by a catch-up-completed event placed in the event log by the catch-up thread group of the catch-up event logic of the event processor in response to the catch-up event logic determining that there is no further legacy data for which a catch-up event has not been generated. Once the event log monitor observes the "catch-up complete" event log entry, the triggered event forwarding is enabled and the event log monitor selects triggered events from the event log, converts them to actual events, and forwards them to the destination system. At this point, catch-up processing is quiesced.

Once the triggered event processing is started by the event log monitor in response to the observation and processing of the catch-up complete event log entry, the order of the triggered events is maintained based on the triggered event sequence numbers. Initially, when triggered event processing is enabled, there may be a large number of triggered events. To process them quickly, it is possible to divide-and-conquer by observing that it is necessary to maintain chronological order only within types of data (entity type), where a type of data indicates that destination tables in the destination system are disjoint. That is, because events targeting different entity types are destined for disjoint tables, it is only necessary to preserve order in events of the same event type, where the event types are identified by the deployment operation when the entity type table is generated. Thus, distributing the event log workload such that there's an event log monitor thread for every set of event types is more expedient.

Hence, the event log monitor threads identify event log entries for triggered events that correspond to the different entity types. Within each entity type, the corresponding event log monitor thread maintains the ordering of the events when forwarding the events to the destination system. As a result, the triggered events are processed by the destination system in sequential order with respect to the particular entity types and their corresponding destination tables in the destination system, following the catch-up events having already been processed by the destination system.

Thus, with the mechanisms of the illustrative embodiments, real-time triggered events are able to be handled while catch-up event processing is performed in a parallel manner. This reduces the downtime of the source and destination systems in response to the triggering of an integration feature that causes a coupling of the legacy static data storage system and the event based data storage system. Because the catch-up events are able to be processed in parallel with the triggered events being received for processing, the speed at which the integration of data from the legacy static data storage system into the event based data storage system, and the initiation of event based data updates after completion of catch-up events, is maximized.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As mentioned above, the illustrative embodiments provide mechanisms for handling the integration of legacy data in a legacy static data storage system into an event based data storage system in response to the enablement of an integration feature. FIG. 1 is an example block diagram illustrating the primary functional elements of these mechanisms in accordance with one illustrative embodiment. It should be appreciated that the elements shown in FIG. 1 are implemented in specifically configured computing devices that are specifically configured to implement logic to perform the functions attributed to the elements shown in FIG. 1. The logic may be implemented as specialized computer hardware, software instructions executed by computing hardware to thereby configured the computing hardware to implement the depicted elements and their functionality, or any combination of specialized computer hardware and software instructions executed by computing hardware. Data structures shown in FIG. 1 are data structures specific to the present illustrative embodiment and are stored in corresponding computing system data storage devices.

As shown in FIG. 1, the primary operational elements of one illustrative embodiment comprises a source computing system 110, an event processor 120, and an event based data storage system (destination system) 130. The source computing system 110 initially comprises the legacy static data storage 112 and its corresponding entity tables (not shown), but after the deployment operation mentioned previously, includes the additional elements 111 and 114-119 shown in FIG. 1, and potentially also the event processor 120 and its elements unless these are provided as in another computing system. It should be noted that the entity table w/event_ID 116 may comprise a plurality of entity tables of the pre-existing legacy static database storage which have been augmented by the deployment operation to include an additional "event_ID" column for storing the unique sequential numerical values associated with generated events targeting the corresponding data or entity.

The entity type table data structures 114 specify all the entities types of the legacy static data storage 112, where an entity object in the entity type table data structure 114 is an encapsulation of business logic and column information for a table in the database of the static data storage 112. The entity object caches the data from the database in the static data storage 112 and provides an object oriented representation of it.

The source computing system 110, in response to the enablement of an integration feature, and as part of a deployment operation, sets database event triggers 111 which may be activated or "fired" in response to particular database events occurring, e.g., insert, update, delete, create, or after operations being performed on database tables. Database event triggers are generally known and thus, a more detailed explanation of database event triggers is not provided herein. More information regarding examples of database event triggers may be found, for example, at the Oracle™ documents web site. The database event triggers 111, in response to being activated or "fired" when actions are detected that manipulate data present in the static database, add events to the entity table with event_id data structure 116, where entries in the entity table with event_id data structure 116 specify the particular entity in the legacy static data storage 112 that is the target of the event and the particular event_id, which is a unique sequential numerical value assigned by a sequence number generator for the event, as discussed hereafter. The activated trigger further causes the generated event to be sent to the trigger processor 118 of the source computing system 110 which also obtains the entity information and event identifier from the entity table with event_id data structure 116. The trigger processor 118 generates event log entries in the event log data structure 140 for triggered events. The trigger processor 118, in one illustrative embodiment, implements a trigger sequence number generator 119 that assigns monotonically increasing sequence numbers to the triggered events generated by the trigger processor 118 and added to the event log 140.

The event processor 120, which may be implemented as part of the source system 110 or as a separate computing element from the source system 110 depending on the desired implementation, comprises catch-up event logic 122 and an event log monitor 124. The catch-up event logic 122 comprises logic for generating catch-up events for pre-existing legacy static data in the static data storage 112 based on the information stored in the entity type table data structure 114 and/or the entity table with event_id data structure 116, and logic for adding these catch-up events to the event log data structure 140. The catch-up event logic 122 may process the entity table with event_ID table data structure 116 and the entity type table data structure 114 to identify entities for which a catch-up event and corresponding catch-up event identifier have not been generated, i.e. there is no catch-up event ID associated with the entity in the entity table with event_ID 116 and the entity type table 114 does not have the "caught-up" semaphore indicating that the entity has been "caught-up" by generation of a catch-up event. For those legacy static database entities for which a catch-up event and corresponding event_id has not been generated, the catch-up event logic 122 generates the catch-up event and posts it to the event log 140, and assigns a unique catch-up event_id to the catch-up event. The catch-up event logic 122, in one illustrative embodiment, implements a catch-up sequence number generator 121 for assigning monotonically increasing sequence numbers for catch-up events for which a catch-up event_id has not been previously generated. The catch-up event_id generated by the catch-up sequence number generator 121 may be added to the entity table with event_id 116 and the catch-up logic 122 may set the corresponding caught-up semaphore in the entity type table 114 to indicate that the entity has been "caught-up" by the generation of a catch-up event and corresponding catch-up event_id.

As mentioned previously, the catch-up sequence numbers for catch-up events and the trigger sequence numbers for the trigger events are maintained separate and non-overlapping with one another. Moreover, as discussed previously, in some illustrative embodiments, a single sequence number generator may be utilized to assign monotonically increasing sequence numbers to both catch-up events and trigger events, with a constant value being added to the trigger events, or catch-up events, depending on the desired implementation, in order to maintain the two sets of sequence numbers separate and non-overlapping. Any mechanism that ensures that the sequence number sets for the catch-up events and the trigger events are separate and non-overlapping may be used without departing from the spirit and scope of the present invention. It should be noted that while the catch-up event_ids, or catch-up event sequence numbers, are not necessary for ordering of the catch-up events, as the catch-up events may be processed by the destination computing system 130 in any order, the triggered events may reference the catch-up event_ids or catch-up event sequence numbers, e.g., in the case of a deletion triggered event, and thus, they are maintained by the mechanisms of the illustrative embodiments.

The event log monitor 124 comprises one or multiple catch-up threads of a catch-up thread group 123, where each catch-up thread in the catch-up thread group 123 may process catch-up events for pre-existing legacy data in the static data storage 112 in parallel, virtually immediately in response to a catch-up event being added to the event log data structure 140. In the case of multiple catch-up threads being utilized, the catch-up events may be processed in parallel by the event log monitor 124 so that catch-up events are sent to the destination system 130 in any order. As noted above, the stipulation is that each of the catch-up threads must converge on a "catch-up complete" event indicating that all catch-up events have been processed.

The event log monitor 124 further comprises one or multiple triggered event threads of a triggered thread group 125, where each triggered event thread may be associated with a different entity type and may operate to ensure proper sequencing of events corresponding to its event type based on triggered event sequence numbers. That is, within a destination table of the destination system 130, the triggered events associated with that table (entity type) are processed in sequence order after the catch-up complete event is observed by the event log monitor 124. Each triggered event thread in the triggered thread group 125 may process triggered events specific to the particular table (entity type) associated with that triggered event thread. Thus, each triggered event thread in the triggered thread group 125 may search the event log 140 for triggered events corresponding to the triggered event thread's particular table (entity type), and process those event log entries in sequential order based on the triggered sequence numbers associated with those event log entries, in order to send events to the destination computing system 130. As noted above, this processing by the triggered event threads is performed only after the catch-up complete event is observed and processed by the event log monitor 124 indicating that catch-up event processing has been completed.

At the destination computing system 130, in one illustrative embodiment, the events dispatched by the catch-up threads and triggered event threads of the event log monitor 124 may be processed via a real-time streaming data pipeline 132, such as an Apache Kafka® pipeline or the like. The real-time streaming events processed through the pipeline 132 may be processed by a topology runner 134, resulting in updates to an entity table 136 associated with a destination event based data storage 138 of the destination system 130.

Thus, in view of FIG. 1 as described above, it can be appreciated that at some point while a user or organization is utilizing the legacy static data storage system (source system) 110, the user or organization will enable an integration feature that enables a transition from the legacy static data storage schema to an event based data storage schema, which results in coupling of the legacy static data storage system (source system) 110 with an event based data storage system (destination system) 130 during the transition from one schema to another. After the integration feature is enabled, data exists in the legacy static data storage 112, while events are occurring with regard to the newly enabled event based data storage system 130. Once the integration feature is enabled, the data present in the legacy static data storage 112 needs to be duplicated to the event based data storage 138 so that users viewing data via the event based data storage system 130 are viewing the correct data in real-time.

In such instances, since both storage systems 110 and 130 are essentially "live" in the sense that users are using them, it is important to minimize downtime and maximize the speed of the operation of the event based data storage system 130. To this end, the mechanisms of the illustrative embodiment introduce the event log 140, also referred to as the event log data structure 140. This new event log data structure 140, and its corresponding logic for maintaining the event log data structure 140, records events that are to be processed by the destination computing system 130 and acts as a first-in-first-out (FIFO) queue cache for recorded events. The event log data structure 140 records which events have been processed by the destination computing system 130 and which have not, as a type of queue head, so that processing can resume if interrupted.

The event processor 120 comprises logic 122 for generating a "catch-up" event for each portion of pre-existing data in the source computing system's static data storage 112, e.g., each pre-existing entity in the legacy static database of the source computing system 110 existing prior to enabling the integration feature. These catch-up events generated by the event processor 120 are recorded in the event log data structure 140 for processing by the destination computing system 130. For example, the entity type table data structure 114 and entity table with event id data structure 116 of the source system 110 may be analyzed by the catch-up event logic 122 of the event processor 120 to thereby generate a catch-up event for each entity in the legacy static database 112 of the source system 110, where the corresponding catch-up events are written to the event log data structure 140 via an add event operation, and the corresponding semaphore in the entity type table 114 is set indicating the entity has been caught-up. In addition, the event processor 120 further comprises logic 124 that monitors the event log data structure 140 and sends unprocessed events to the destination system 130 in accordance with the event ordering of the illustrative embodiments, as previously described above. That is, the event ordering involves sending catch-up events to the destination computing system 130 virtually immediately upon generation and posting of these events to the event log 140 via one or more catch-up threads 123 that process these catch-up events without regard to ordering as long as the catch-up threads converge on a "catch-up complete" event.

The event ordering further involves the sequential processing of triggered events according to a triggered event sequence numbering by the trigger sequence number generator 119 of the trigger processor 118, only after all catch-up events have been processed as indicated by the observance and processing of the "catch-up complete" event in the event log 140. The triggered event sequence numbering may be maintained sequential in association with events within an entity type, but with multiple triggered event threads 125 processing triggered events for different entity types in parallel.

Thus, any number of catch-up threads 123 may be spawned to handle the catch-up event processing, as long as these catch-up threads 123 rendezvous their processing to post a single catch-up complete event log entry in the event log data structure 140 after all the pre-existing data in the static data storage 112 of the source system 110 has had a corresponding catch-up event generated and an event log entry added for it to the event log data structure 140. The trigger thread group 125 may comprise one or multiple triggered event threads that are responsible for generating events corresponding to database triggers that are activated or "fired" once the integration feature has been enabled. The ordering of the triggered events is carefully preserved using assigned triggered event sequence numbers, as described above, where each triggered event thread may be associated with a different entity type, corresponding to a destination table in the destination system 130.

These two different disjointed thread groups 123 and 125 allow for a performant solution rather than utilizing a single thread to process all events in a chronological manner. Since two different disjointed thread groups 123, 125 are implemented in the illustrative embodiments, with the catch-up events being generated for the legacy data in the static database 112 of the source system 110 and the trigger events for new events generated for database triggers that have been activated since the integration feature was enabled, a new event ordering architecture is provided to ensure that the triggered events are processed after the initial catch-up events, while maintaining the chronological order of triggered events. With this architecture, in order to preserve order of the generated events, an event log data structure 140 is provided that operates as an event cache by holding events that are to be forwarded to the destination system 130. In order to ensure proper sequencing of the events, in one illustrative embodiment, two sequence number generators are utilized, i.e. the catch-up sequence number generator 121, and the triggered events trigger sequence number generator 119. Alternatively, a single sequence number generator may be utilized with a constant or other mechanism provided to ensure that the two sequence number sets are maintained separate and non-overlapping.

When the integration feature is enabled, the database triggers 111 are set and may begin to be activated or "fired." Contemporaneously, the catch-up process of the catch-up event logic 122 for generating catch-up events for pre-existing legacy data 112 in the source system 100, and sending them to the event log data structure 140 executes. Events are created and placed into the event log data structure 140 by both the trigger processor 118 and the catch-up event logic 122 concurrently.

Event log monitor logic 124 monitors the event log data structure 140 and forwards events it finds in the event log data structure 140 to the destination system 130. Catch-up events are forwarded virtually immediately, in order, as they are generated by the catch-up event logic 122, i.e. event log entries are converted into actual events and sent to the destination system 130 via the real-time streaming pipeline 132. Thus, the event log 140 entries for catch-up events are "consumed" in a queue-like fashion by the event log monitor 124, meaning that they are marked in such a way that they are not processed again by the event log monitor 124. The event log 140 entries are not removed, but rather remain in the event log for audit and/or good practices (GxP) purposes.

Forwarding of triggered events is repressed until the catch-up processing by the catch-up event logic 122 and event log monitor 124 catch-up threads 123 is complete, as evidenced by a catch-up-completed event placed in the event log by the catch-up event logic 122 in response to the catch-up event logic 122 determining that there is no further legacy data in the static data storage 112 for which a catch-up event has not been generated. Once the event log monitor 124 observes the "catch-up complete" event log entry in the event log data structure 140, the triggered event forwarding by the triggered event threads 125 is enabled and the triggered event threads 125 of the event log monitor 124 selects triggered events from the event log 140, converts them to actual events, and forwards them to the destination system 130. At this point, catch-up processing is quiesced.

Once the triggered event processing is started by the event log monitor 124, in response to the observation and processing of the catch-up complete event log entry, the order of the triggered events is maintained based on the triggered event sequence numbers. The event log workload for triggered events is distributed such that there's an event log monitor triggered event thread 125 for every set of event types in order to make triggered event processing more expedient. Thus, within each entity type, the corresponding event log monitor triggered event thread 125 maintains the ordering of the events when forwarding the events to the destination system 130. As a result, the triggered events are processed by the destination system 130 in sequential order with respect to the particular entity types and their corresponding destination tables in the event based data storage 138 of the destination system 130, following the catch-up events having already been processed by the destination system 130.

Thus, with the mechanisms of the illustrative embodiments, real-time triggered events are able to be handled while catch-up event processing is performed in a parallel manner. This reduces the downtime of the source and destination systems in response to the triggering of an integration feature that causes a coupling of the legacy static data storage system 110 and the event based data storage system 130. Because the catch-up events are able to be processed in parallel with the triggered events being received for processing, the speed at which the integration of data from the legacy static data storage system 110 into the event based data storage system 130, and the initiation of event based data updates after completion of catch-up events, is maximized. Once the catch-up event and triggered event processing is completed, the triggered event based processing continues to maintain the data present in the event based data storage system 130.

Figure 2:
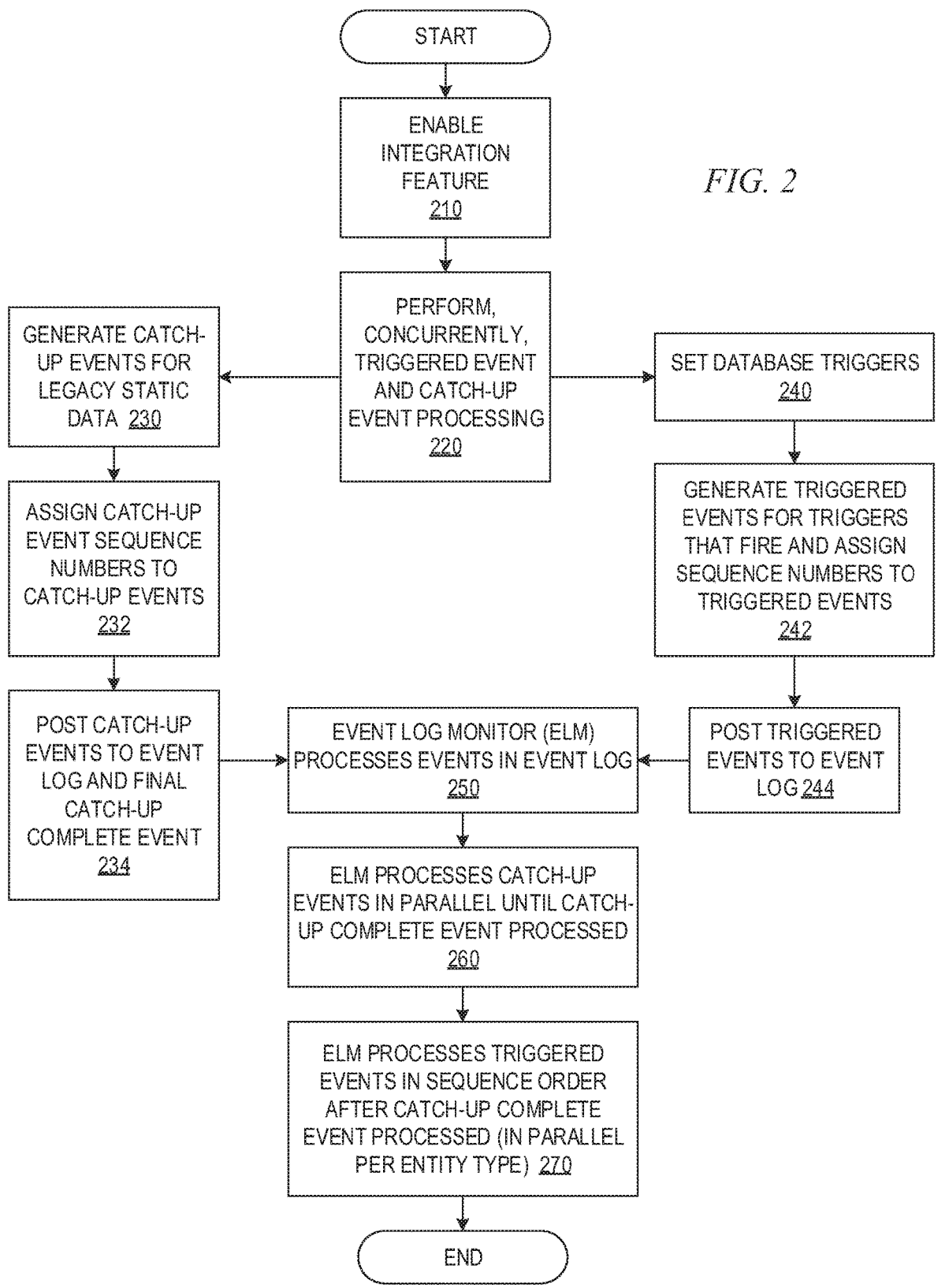
FIG. 2 is a flowchart outlining an example operation for handling integration of legacy static data from a static data storage system to an event based data storage system in response to the enablement of an integration feature in accordance with one illustrative embodiment.

FIG. 2 is a flowchart outlining an example operation for handling integration of legacy static data from a static data storage system into an event based data storage system in response to the enablement of an integration feature in accordance with one illustrative embodiment. As shown in FIG. 2, the operation starts by a user or organization enabling an integration feature of an event based data storage system (step 210). Thereafter, concurrent triggered event and catch-up event processing is enabled (step 220). This leads to two separate, but concurrent, processing paths being performed in parallel with one another. In a first of these processing paths, catch up events are generated for legacy static data (step 230), assigned catch-up event sequence numbers (step 232), and posted to an event log until all of the static data has a corresponding catch-up event generated at which point a "catch-up complete" event is posted to the event log (step 234). In the second processing path, database triggers are set (step 240) and triggered events are generated for triggers that are fired (step 242). For the triggered events, corresponding sequence numbers are assigned to the triggered events. The triggered events are posted to the event log (step 244) concurrently with the posting of catch-up events to the event log (step 234).

The event log monitor (ELM) processes events in the event log (step 250). In particular, catch-up events are processed, potentially in parallel, by one or more catch-up threads that generate and send events to the destination system in a FIFO manner without concern for ordering of the catch-up events (step 260). Once a catch-up complete event is processed in step 260, the ELM processes triggered events in the event log in sequence order (step 270). As discussed above, the processing of triggered events may occur in parallel using multiple triggered event threads, with each triggered event thread being associated with a different entity type and processing triggered events targeting their entity type in sequence order. The operation then terminates.

Figure 3:
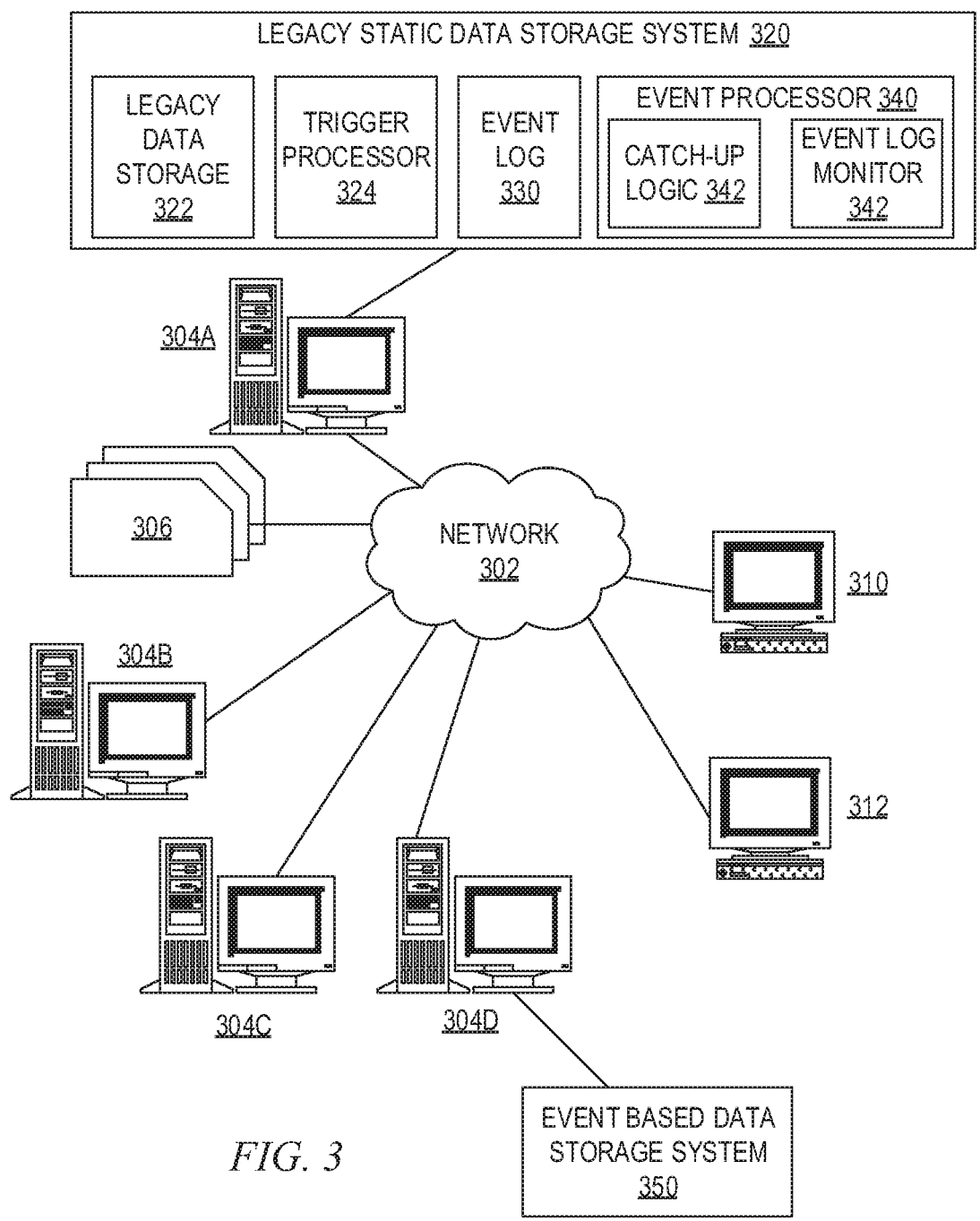
FIG. 3 is an example diagram of a distributed data processing system in which aspects of the illustrative embodiments may be implemented.
Figure 4:
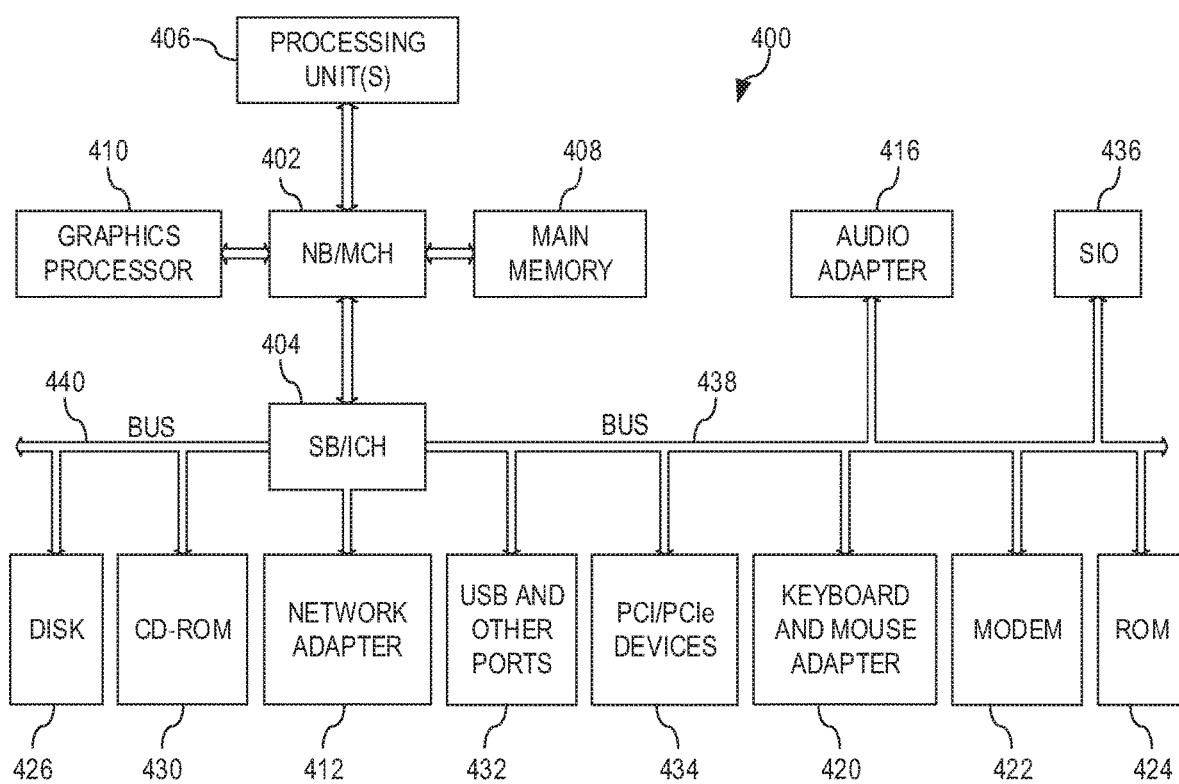
FIG. 4 is an example block diagram of a computing device in which aspects of the illustrative embodiments may be implemented.

In view of the above description, it is apparent that the illustrative embodiments may be utilized in many different types of data processing environments in which an integration of legacy static data from a legacy static data storage system is performed with an event based data storage system. In order to provide a context for the description of the specific elements and functionality of the illustrative embodiments, FIGS. 3 and 4 are provided hereafter as example environments in which aspects of the illustrative embodiments may be implemented. It should be appreciated that FIGS. 3 and 4 are only examples and are not intended to assert or imply any limitation with regard to the environments in which aspects or embodiments of the present invention may be implemented. Many modifications to the depicted environments may be made without departing from the spirit and scope of the present invention.

FIG. 3 depicts a pictorial representation of an example distributed data processing system in which aspects of the illustrative embodiments may be implemented. Distributed data processing system 300 may include a network of computers in which aspects of the illustrative embodiments may be implemented. The distributed data processing system 300 contains at least one network 302, which is the medium used to provide communication links between various devices and computers connected together within distributed data processing system 300. The network 302 may include connections, such as wire, wireless communication links, or fiber optic cables.

In the depicted example, servers 304A-304D are connected to network 302 along with storage unit 306. In addition, clients 310 and 312 are also connected to network 302. These clients 310-312 may be, for example, personal computers, network computers, or the like. In the depicted example, one or more of servers 304A-304D provide data and/or computer instructions, such as boot files, operating system images, and applications, to the clients 310-312. Clients 310-312 are clients to one or more of servers 304A-304D in the depicted example. Distributed data processing system 300 may include additional servers, clients, and other devices not shown.

In the depicted example, distributed data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 300 may also be implemented to include a number of different types of networks, such as for example, an intranet, a local area network (LAN), a wide area network (WAN), or the like. As stated above, FIG. 3 is intended as an example, not as an architectural limitation for different embodiments of the present invention, and therefore, the particular elements shown in FIG. 3 should not be considered limiting with regard to the environments in which the illustrative embodiments of the present invention may be implemented.

As shown in FIG. 3, one or more of the computing devices, e.g., server 304A, may be specifically configured to implement a legacy static data storage system 320 for a user or organization. In accordance with the illustrative embodiments, the legacy static data storage system 320 is further configured to implement a legacy data storage 322, a trigger processor 324, an event log 330, and an event processor 340 which implements catch-up logic 342 and event log monitor 342. These elements operate in a manner as previously described above with regard to FIG. 1 with regard to similar elements shown in FIG. 1. Moreover, server 304D may be configured to implement an event based data storage system 350, similar to destination system 130 in FIG. 1. It should be appreciated that the servers 304A and 304D may be associated with the same user or organization.

The configuring of the computing device, e.g., server 304A and server 304D, may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as servers 304A and 304D, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described herein, the implementation of the mechanisms of the illustrative embodiments improves the functionality of the computing device and provides a useful and concrete result that facilitates integration of legacy static data into an event based data storage system in response to an integration feature being enabled in the event based data storage system 150 with minimum downtime and maximum speed.

The specifically configured computing devices, or data processing systems, of the illustrative embodiments may comprise various hardware elements which are specifically configured, either through hardware configuration, software configuration, or a combination of hardware and software configuration, to implement one or more of the systems/subsystems described herein. FIG. 4 is a block diagram of just one example data processing system in which aspects of the illustrative embodiments may be implemented. Data processing system 400 is an example of a computer, such as servers 304A and 304D in FIG. 3, or even client computing devices 310-312 in FIG. 3, in which computer usable code or instructions implementing the processes and aspects of the illustrative embodiments of the present invention may be located and/or executed so as to achieve the operation, output, and external effects of the illustrative embodiments as described herein.

In the depicted example, data processing system 400 employs a hub architecture including north bridge and memory controller hub (NB/MCH) 402 and south bridge and input/output (I/O) controller hub (SB/ICH) 404. Processing unit 406, main memory 408, and graphics processor 410 are connected to NB/MCH 402. Graphics processor 410 may be connected to NB/MCH 402 through an accelerated graphics port (AGP).

In the depicted example, local area network (LAN) adapter 412 connects to SB/ICH 404. Audio adapter 416, keyboard and mouse adapter 420, modem 422, read only memory (ROM) 424, hard disk drive (HDD) 426, CD-ROM drive 430, universal serial bus (USB) ports and other communication ports 432, and PCI/PCIe devices 434 connect to SB/ICH 404 through bus 438 and bus 440. PCI/PCIe devices may include, for example, Ethernet adapters, add-in cards, and PC cards for notebook computers. PCI uses a card bus controller, while PCIe does not. ROM 424 may be, for example, a flash basic input/output system (BIOS).

HDD 426 and CD-ROM drive 430 connect to SB/ICH 404 through bus 440. HDD 426 and CD-ROM drive 430 may use, for example, an integrated drive electronics (IDE) or serial advanced technology attachment (SATA) interface. Super I/O (SIO) device 436 may be connected to SB/ICH 404.

An operating system runs on processing unit 406. The operating system coordinates and provides control of various components within the data processing system 400 in FIG. 4. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 400.

As a server, data processing system 400 may be, for example, an IBM eServer™ System P® computer system, Power™ processor based computer system, or the like, running the Advanced Interactive Executive (AIX®) operating system or the LINUX® operating system. Data processing system 400 may be a symmetric multiprocessor (SMP) system including a plurality of processors in processing unit 406. Alternatively, a single processor system may be employed.

Instructions for the operating system, the object-oriented programming system, and applications or programs are located on storage devices, such as HDD 426, and may be loaded into main memory 408 for execution by processing unit 406. The processes for illustrative embodiments of the present invention may be performed by processing unit 406 using computer usable program code, which may be located in a memory such as, for example, main memory 408, ROM 424, or in one or more peripheral devices 426 and 430, for example.

A bus system, such as bus 438 or bus 440 as shown in FIG. 4, may be comprised of one or more buses. Of course, the bus system may be implemented using any type of communication fabric or architecture that provides for a transfer of data between different components or devices attached to the fabric or architecture. A communication unit, such as modem 422 or network adapter 412 of FIG. 4, may include one or more devices used to transmit and receive data. A memory may be, for example, main memory 408, ROM 424, or a cache such as found in NB/MCH 402 in FIG. 4.

As mentioned above, in some illustrative embodiments the mechanisms of the illustrative embodiments may be implemented as application specific hardware, firmware, or the like, application software stored in a storage device, such as HDD 426 and loaded into memory, such as main memory 408, for executed by one or more hardware processors, such as processing unit 406, or the like. As such, the computing device shown in FIG. 4 becomes specifically configured to implement the mechanisms of the illustrative embodiments and specifically configured to perform the operations and generate the outputs described herein with regard to the legacy static data storage system and/or the event based data storage system.

Those of ordinary skill in the art will appreciate that the hardware in FIGS. 3 and 4 may vary depending on the implementation. Other internal hardware or peripheral devices, such as flash memory, equivalent non-volatile memory, or optical disk drives and the like, may be used in addition to or in place of the hardware depicted in FIGS. 3 and 4. Also, the processes of the illustrative embodiments may be applied to a multiprocessor data processing system, other than the SMP system mentioned previously, without departing from the spirit and scope of the present invention.

Moreover, the data processing system 400 may take the form of any of a number of different data processing systems including client computing devices, server computing devices, a tablet computer, laptop computer, telephone or other communication device, a personal digital assistant (PDA), or the like. In some illustrative examples, data processing system 400 may be a portable computing device that is configured with flash memory to provide non-volatile memory for storing operating system files and/or user-generated data, for example. Essentially, data processing system 400 may be any known or later developed data processing system without architectural limitation.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, for integrating a legacy static data storage system with an event based data storage system, the method comprising:
    enabling an integration feature that initiates integration of the legacy static data storage system with the event based data storage system;
    generating, by catch-up logic of the data processing system, for pre-existing legacy data stored in the legacy static data storage system, catch-up events, wherein each catch-up event of the catch-up events corresponds to a portion of the pre-existing legacy data;
    generating, by a trigger processor of the data processing system, at approximately a same time that the catch-up events are generated, one or more triggered events in response to one or more database triggers of the event based data storage system being activated;
    executing a deployment operation, in a source computing device comprising the legacy static data storage system, that generates an event log data structure in the source computing device and an entity type table data structure in the source computing device, wherein the entity type table data structure comprises, for each portion of the pre-existing legacy data in the legacy static data storage system, a corresponding entry having a catch-up semaphore indicating whether or not a catch-up event has been generated for the portion of pre-existing legacy data;
    storing both the catch-up events and the one or more triggered events in the event log data structure in response to the generation of the catch-up events and the generation of the one or more triggered events;
    processing in parallel, by an event log monitor of an event processor in the data processing system, the catch-up events in the event log data structure and sending the processed catch-up events to the event based data storage system; and
    processing in a sequential order, by the event log monitor, the one or more triggered events after all catch-up events in the event log data structure have been processed, and sending the processed one or more triggered events to the event based data storage system, wherein the sequential order is processed based on triggered event sequence identifiers assigned to the one or more triggered events.

2. The method of claim 1, wherein the deployment operation modifies one or more pre-existing legacy static entity tables to include an event identifier field, and wherein the deployment operation extends entries of the one or more pre-existing legacy static entity tables of the legacy static data storage system to include, in each entry, an event identifier, in the event identifier field, corresponding to at least one of a catch-up event or a triggered event associated with a corresponding portion of data associated with the entry.

3. The method of claim 1, wherein generating, for pre-existing legacy data stored in the legacy static data storage system, catch-up events for integrating the legacy data in the event based data storage system comprises:
    analyzing the entity type table data storage to identify entries for which a corresponding catch-up semaphore does not identify the entry as having a previously generated catch-up event; and
    generating a catch-up event for entries for which the corresponding catch-up semaphore does not identify the entry as having a previously generated catch-up event and not generating a catch-up event for entries for which the corresponding catch-up semaphore identifies the entry as having a previously generated catch-up event.

4. The method of claim 1, wherein generating catch-up events for integrating the legacy data in the event based data storage system comprises assigning, to each catch-up event a unique catch-up sequence identifier, and wherein generating one or more triggered events in response to one or more database triggers of the event based data storage system being activated comprises assigning, to each triggered event a unique triggered event sequence identifier, wherein the unique catch-up sequence identifiers do not overlap the unique triggered event sequence identifier.

5. The method of claim 4, wherein the catch-up events are processed by the event log monitor regardless of sequential order of the catch-up sequence identifiers of the catch-up events.

6. The method of claim 5, wherein the triggered events are processed by the event log monitor in strict sequential order of the triggered event sequence identifiers of the triggered events.

7. The method of claim 1, wherein the event log monitor comprises a plurality of catch-up event threads, wherein the plurality of catch-up event threads process catch-up events as they are added to the event log data structure to send corresponding event messages to a destination computing system hosting the event based data storage system.

8. The method of claim 1, wherein the event log monitor comprises a plurality of triggered event threads, each triggered event thread being associated with a different entity type of entities in the legacy static data storage system or added to the legacy static data storage system ater enabling the integration feature, and wherein each triggered event thread enforces strict sequential ordering of triggered events targeting an associated entity type in accordance with triggered event sequence identifiers assigned b the triggered events targeting the associated entity type.

9. The method of claim 1, wherein the catch-up logic posts a catch-up complete event to the event log data structure in response to all of the portions of pre-existing legacy static data in the legacy static data storage having corresponding catch-up events generated for the portions of pre-existing legacy static data, and wherein the event log monitor initiates processing the one or more triggered events in response to encountering the catch-up complete event in the event log data structure but suppresses processing of the one or more triggered events, by the event log monitor, prior to encountering the catch-up complete event in the event log data structure.

10. The method of claim 1, wherein the entity type table data structure contains a listing of entities whose data has been transformed into events in the event log data structure.

11. A computer program product comprising a computer readable storage medium having a computer readable program stored herein, wherein the computer readable program, when executed in a data processing system, causes the data processing system to:
   enable an integration feature that initiates integration of a legacy static data storage system with an event based data storage system;
   generate, by catch-up logic of the data processing system, for pre-existing legacy data stored in the legacy static data storage system, catch-up events, wherein each catch-up event of the catch-up events corresponds to a portion of the pre-existing legacy data;
   generate, by a trigger processor of the data processing system, at approximately a same time that the catch-up events are generated, one or more triggered events in response to one or more database triggers of the event based data storage system being activated;
   execute a deployment operation, in a source computing device comprising the legacy static data storage system, that generates an event log data structure in the source computing device and an entity type table data structure in the source computing device, wherein the entity type table data structure comprises, for each portion of the pre-existing legacy data in the legacy static data storage system, a corresponding entry having a catch-up semaphore indicating whether or not a catch-up event has been generated for the portion of pre-existing legacy data;
   store both the catch-up events and the one or more triggered events in an event log data structure in response to the generation of the catch-up events and the generation of the one or more triggered events;
   process in parallel, by an event log monitor of an event processor in the data processing system, the catch-up events in the event log data structure and sending the processed catch-up events to the event based data storage system; and
   process in a sequential order, by the event log monitor, the one or more triggered events after all catch-up events in the event log data structure have been processed, and sending the processed one or more triggered events to the event based data storage system, wherein the sequential order is processed based on triggered event sequence identifiers assigned to the one or more triggered events.

12. The computer program product of claim 11, wherein the deployment operation modifies one or more pre-existing legacy static entity tables to include an event identifier field, and wherein the deployment operation extends entries of the one or more pre-existing legacy static entity tables of the legacy static data storage system to include, in each entry, an event identifier, in the event identifier field, corresponding to at least one of a catch-up event or a triggered event associated with a corresponding portion of data associated with the entry.

13. The computer program product of claim 11, wherein the computer readable program further causes the data processing system to generate, for pre-existing legacy data stored in the legacy static data storage system, catch-up events for integrating the legacy data in the event based data storage system at least by:
   analyzing the entity type table data storage to identify entries for which a corresponding catch-up semaphore does not identify the entry as having a previously generated catch-up event; and
   generating a catch-up event for entries for which the corresponding catch-up semaphore does not identify the entry as having a previously generated catch-up event and not generating a catch-up event for entries for which the corresponding catch-up semaphore identifies the entry as having a previously generated catch-up event.

14. The computer program product of claim 11, wherein the computer readable program further causes the data processing system to generate catch-up events for integrating the legacy data in the event based data storage system at least by assigning, to each catch-up event, a unique catch-up sequence identifier, and wherein the computer readable program further causes the data processing system to generate one or more triggered events in response to one or more database triggers of the event based data storage system being activated at least by assigning, to each triggered event, a unique triggered event sequence identifier, wherein the unique catch-up sequence identifiers do not overlap the unique triggered event sequence identifier.

15. The computer program product of claim 14, wherein the catch-up events are processed by the event log monitor regardless of sequential order of the catch-up sequence identifiers of the catch-up events.

16. The computer program product of claim 15, wherein the triggered events are processed by the event log monitor in strict sequential order of the triggered event sequence identifiers of the triggered events.

17. The computer program product of claim 11, wherein the event log monibr comprises a plurality of catch-up event threads, wherein the plurality of catch-up event threads process catch-up events as they are added to the event log data structure to send corresponding event messages to a destination computing system hosting the event based data storage system.

18. The computer program product of claim 11, wherein the event log monitor comprises a plurality of triggered event threads, each triggered event thread being associated with a different entity type of entities in the legacy static data storage system or added to the legacy static data storage system after enabling the integration feature, and wherein each triggered event thread enforces strict sequential ordering of triggered events targeting an associated entity type in accordance with triggered event sequence identifiers assigned to the triggered events targeting the associated entity type.

19. An apparatus comprising:
a processor; and
a memory coupled to the processor, wherein the memory comprises instructions which, when executed by the processor, cause the processor to:
enable an integration feature that initiates integration of a legacy static data storage system with an event based data storage system;
generate, by catch-up logic of the data processing system, for pre-existing legacy data stored in the legacy static data storage system, catch-up events, wherein each catch-up event of the catch-up events corresponds to a portion of the pre-existing;
generate, by a trigger processor of the data processing system, at approximately a same time that the catch-up events are generated, one or more triggered events in response to one or more database triggers of the event based data storage system being activated;
execute a deployment operation, in a source computing device comprising the legacy static data storage system, that generates an event log data structure in the source computing device and an entity type table data structure in the source computing device, wherein the entity type table data structure comprises, for each portion of the pre-existing legacy data in the legacy static data storage system, a corresponding entry having a catch-up semaphore indicating whether or not a catch-up event has been generated for the portion of pre-existing legacy data;
store both the catch-up events and the one or more triggered events in an event log data structure in response to the generation of the catch-up events and the generation of the one or more triggered events;
process in parallel, by an event log monitor of an event processor in the data processing system, the catch-up events in the event log data structure and sending the processed catch-up events to the event based data storage system; and
process in a sequential order, by the event log monitor, the one or more triggered events after all catch-up events in the event log data structure have been processed, and sending the processed one or more triggered events to the event based data storage system, wherein the sequential order is processed based on triggered event sequence identifiers assigned to the one or more triggered events.

\* \* \* \* \*